United States Patent [19]
Cooke et al.

[11] Patent Number: 5,710,697
[45] Date of Patent: Jan. 20, 1998

[54] POWER SUPPLY CONTROLLER HAVING FREQUENCY FOLDBACK AND VOLT-SECOND DUTY CYCLE CLAMP FEATURES

[75] Inventors: Philip R. Cooke, Nashua, N.H.; John R. Wiggenhorn, Cary, N.C.

[73] Assignee: Unitrode Corporation, Merrimack, N.H.

[21] Appl. No.: 622,009

[22] Filed: Mar. 26, 1996

[51] Int. Cl.$^6$ .................................................. H02M 3/335
[52] U.S. Cl. .................................................. 363/21
[58] Field of Search .................... 363/21, 16, 20, 363/22, 23, 97; 323/222, 223, 284, 285, 286

[56] References Cited

U.S. PATENT DOCUMENTS

| | | | |
|---|---|---|---|
| 3,660,751 | 5/1972 | Bulling | 321/2 |
| 3,911,352 | 10/1975 | Slack | 321/14 |
| 4,017,786 | 4/1977 | Jensen | 321/45 R |
| 4,020,408 | 4/1977 | Grant | 321/2 |
| 4,127,894 | 11/1978 | Bishop et al. | 363/56 |
| 4,352,153 | 9/1982 | Voyer | 363/56 |
| 4,386,311 | 5/1983 | Bafaro | 323/271 |
| 4,438,485 | 3/1984 | Voigt | 363/21 |
| 4,453,206 | 6/1984 | Voight | 363/21 |
| 4,455,526 | 6/1984 | Miller | 323/282 |
| 4,459,539 | 7/1984 | Cordy, Jr. | 323/299 |
| 4,498,128 | 2/1985 | Peterson et al. | 363/21 |
| 4,616,301 | 10/1986 | Small | 363/26 |
| 4,630,187 | 12/1986 | Henze | 363/41 |
| 4,634,956 | 1/1987 | Davis et al. | 323/222 |
| 4,678,984 | 7/1987 | Henze | 323/285 |
| 4,713,740 | 12/1987 | Drabing | 363/17 |
| 4,715,001 | 12/1987 | Deem et al. | 364/484 |
| 4,816,740 | 3/1989 | Maier | 323/275 |
| 4,823,070 | 4/1989 | Nelson | 323/285 |
| 4,858,052 | 8/1989 | McDonnal | 361/18 |
| 4,872,100 | 10/1989 | Diaz | 363/41 |
| 4,885,674 | 12/1989 | Varga et al. | 363/21 |
| 4,891,744 | 1/1990 | Yamamoto et al. | 363/89 |
| 4,931,717 | 6/1990 | Gray et al. | 323/299 |
| 5,019,957 | 5/1991 | Wilkinson | 363/56 |
| 5,077,652 | 12/1991 | Faley | 363/97 |

(List continued on next page.)

OTHER PUBLICATIONS

Unitrode Integrated Circuits Corporation, "*Average Current Mode PWM Controller*", UC1848, UC2848, UC3848 preliminary data sheet, Nov. 1994, pp. 6/254–6/261.

Richard Redl, et al., "*Overload–Protection Methods for Switching–Mode DC/DC Converters classification, Analysis, and Improvements*", IEEE 1987, pp. 107–118.

Brian P. Erisman, et al., Toko America, Inc./ IC Design Center, "*A Novel Primary–Side Controller and an Error Signal Isolator in Low Cost Five–Pin Packages*", IEEE 1993, pp. 1–11.

Toko Inc., "*Primary Side Controller*", TK75001/75003, data sheet, May 1995, pp. 1–8.

Motorola, "*Advance Information High Performance Current Mode Controller*", MC44602, data sheet, not dated, pp. 3/419–3/434.

National Semiconductor, "*LM3101 Secondary–Side PWM Controller*", data sheet, Sep. 1993, pp. 1–18.

Unitrode Integrated Circuits Corp., "*Primary Side Controller*", UC7501/3–2 UC7501/3–3; data sheet, Jan. 1995, pp. 6/461–6/463.

*Primary Examiner*—Aditya Krishnan
*Attorney, Agent, or Firm*—Weingarten, Schurgin, Gagnebin & Hayes LLP

[57] ABSTRACT

A power supply controller implementing frequency foldback and volt-second duty cycle clamp features. An oscillator timing capacitor is charged with a fixed current and is discharged with a fixed current when the output voltage is above a predetermined level and with a decreasing current when the output voltage falls below the predetermined level, so as to decrease the power supply operating frequency during short circuit or overload fault conditions. A volt-second duty cycle clamp circuit limits the duty cycle to a maximum value which is independent of the tolerance of a capacitor which sets the maximum duty cycle as a function of the power supply input voltage.

21 Claims, 7 Drawing Sheets

U.S. PATENT DOCUMENTS

| | | | |
|---|---|---|---|
| 5,101,175 | 3/1992 | Vaisanen | 330/279 |
| 5,138,250 | 8/1992 | Capel | 323/283 |
| 5,177,676 | 1/1993 | Inam et al. | 363/80 |
| 5,245,520 | 9/1993 | Imbertson | 363/17 |
| 5,282,123 | 1/1994 | Boylan et al. | 363/21 |
| 5,321,348 | 6/1994 | Vinciarelli et al. | 323/222 |
| 5,325,062 | 6/1994 | Bachand et al. | 324/537 |
| 5,335,162 | 8/1994 | Martin-Lopez et al. | 363/97 |
| 5,378,935 | 1/1995 | Korhonen et al. | 327/114 |
| 5,392,206 | 2/1995 | Peterson et al. | 363/19 |
| 5,410,467 | 4/1995 | Smith et al. | 363/131 |
| 5,418,709 | 5/1995 | Lukemire | 323/222 |
| 5,446,417 | 8/1995 | Korhonen et al. | 331/57 |
| 5,457,624 | 10/1995 | Hastings | 363/127 |
| 5,481,178 | 1/1996 | Wilcox et al. | 323/287 |

POWER SUPPLY CONTROLLER HAVING FREQUENCY FOLDBACK AND VOLT-SECOND DUTY CYCLE CLAMP FEATURES

FIELD OF THE INVENTION

This invention relates generally to power supply controllers and, more specifically, to a power supply controller including frequency foldback and volt-second duty cycle clamp features.

BACKGROUND OF THE INVENTION

Under short circuit and overload fault conditions, the output voltage of a power supply decreases and significant current flows which can destroy various components. Power supply control circuits often include circuitry for protecting the supply and load from short circuit and overload conditions. One type of fault protection technique which is typically used in linear regulators is referred to as current foldback, whereby a series-pass element reduces the output current in response to reduced output voltage.

Another fault protection technique which is typically used in pulse width modulation (PWM) converters is referred to as pulse-by-pulse current limiting, in which the output current of the power supply is sensed and fed back to an overcurrent comparator for comparison to a reference voltage. The output of the overcurrent comparator is coupled to a pulse width modulation (PWM) comparator. When the output of the overcurrent comparator indicates a fault condition, the output of the PWM comparator terminates conduction of the power switch, so as to decrease the on time of the switch during each cycle in which the fault condition is sensed.

Pulse-by-pulse current limiting is subject to propagation delays associated with sensing and responding to changes in the output voltage or current. As switching frequencies increase, propagation delays become a significant portion of the operating period, thereby the current to exceed the intended limits.

Another detrimental condition in PWM converters is transformer saturation. One way to prevent transformer saturation is to clamp the voltage across the primary winding. Additional protection against transformer saturation is often provided by limiting the duty cycle of the power switch to some maximum duty cycle. This maximum duty cycle can be programmed to a fixed value or, alternatively, may be of the volt-second type, in which the volt-second product applied to the transformer is forced to be less than or equal to some maximum fixed value. In accordance with one such volt-second duty cycle clamp, the maximum volt-second product applied to the transformer is limited in accordance with the level of the input voltage. However, component tolerances can limit the effectiveness of such a volt-second duty cycle clamp.

SUMMARY OF THE INVENTION

A power supply controller is disclosed for controlling the duty cycle of a power supply switch as a function of an oscillator ramp signal generated across a timing capacitor. The controller includes a first current source for charging the timing capacitor with a fixed current and a second current source for discharging the timing capacitor with a fixed current when the output voltage is greater than a predetermined level and for discharging the timing capacitor with a variable current when the output voltage is less than the predetermined level. In particular, the variable current with which the timing capacitor is discharged decreases as the output voltage decreases below the predetermined level.

With this arrangement, a frequency foldback scheme is implemented with which the off time of the oscillator is increased as the output voltage falls below the predetermined level, for example, as a result of an output short circuit or overload fault condition. In this way, the operating frequency is decreased and the average output current sourced to the load is reduced.

Also described is a volt-second duty cycle clamp circuit for limiting the duty cycle of the power switch to a maximum value which varies in accordance with the power supply input voltage. In particular, the maximum volt-second duty cycle is set by a charge balance circuit as a function of the voltage across a capacitor which is charged by a current inversely proportional to the input voltage. The maximum volt-second duty cycle is independent of the component tolerance of the capacitor.

With this arrangement, a volt-second duty cycle clamp is provided which limits the duty cycle of the power supply switch during transient line or load conditions which could otherwise saturate the power supply transformer. In particular, the maximum duty cycle to which the switch is limited varies in accordance with the input voltage such that a higher duty cycle is permitted at lower input voltages and a lower duty cycle is permitted at higher input voltages. The resulting duty-cycle clamp level is highly accurate due to the independence of the maximum volt-second duty cycle on the capacitor tolerance.

In one embodiment, the volt-second duty cycle clamp circuit includes a comparator for comparing the oscillator ramp signal to the voltage across a capacitor to provide a volt-second duty cycle clamp signal at an output thereof. A first current source, responsive to a voltage inversely proportional to the supply input voltage, generates a charging current for the capacitor. A second current source, coupled to the capacitor through a switch, is controlled in response to the volt-second duty cycle clamp signal for selectively coupling and decoupling the second current source to and from the capacitor in order to discharge the capacitor.

BRIEF DESCRIPTION OF THE DRAWINGS

The foregoing features of this invention, as well as the invention itself, may be more fully understood from the following detailed description of the drawings in which.

DESCRIPTION OF THE PREFERRED EMBODIMENT

Figure 1:
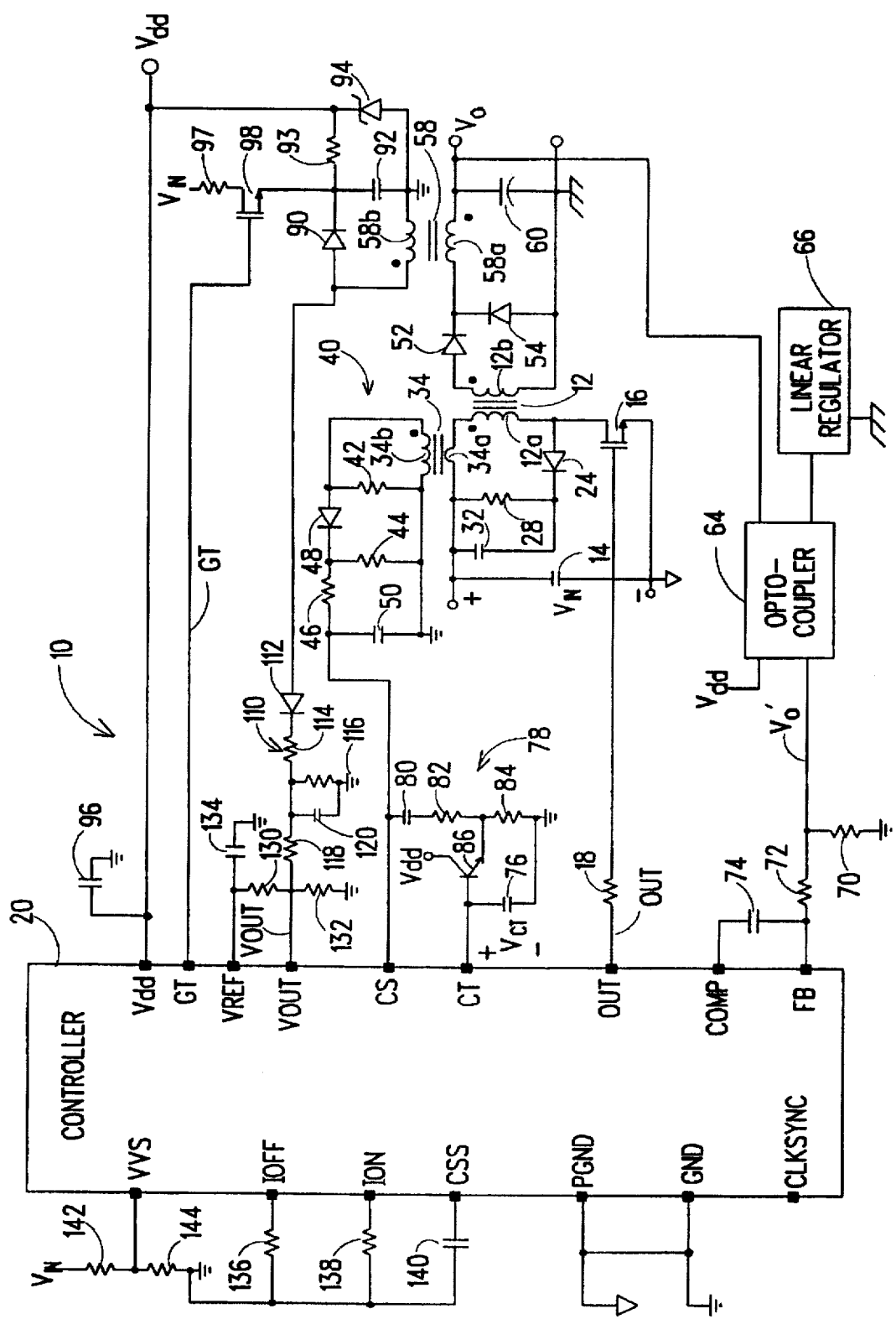
FIG. 1 is schematic of a power supply including a controller implementing frequency foldback and volt-second duty cycle clamp features.

Referring to FIG. 1, a switch mode power supply converter 10 includes a current mode, pulse width modulation (PWM) controller 20, which is preferably implemented as a BiCMOS integrated circuit. Frequency foldback and volt-second duty cycle clamp features of the controller 20 will be described below. The illustrative converter 10 is a single-ended forward converter for converting a regulated or non-regulated DC input voltage $V_{IN}$ provided across a storage capacitor 14 to a regulated DC output voltage $V_O$.

The converter 10 includes a transformer 12 having a primary winding 12a and a secondary winding 12b. The primary winding 12a is coupled in series with a primary switch 16, such as an NMOS device, which is driven by a signal provided at the OUT pin of the controller 20 via a series resistor 18. The voltage across the primary winding 12a is clamped by a conventional diode 24, resistor 28 and capacitor 32 arrangement. The secondary winding 12b is coupled to a forward diode 52 and a freewheeling diode 54, which are further coupled to a winding 58a of an output inductor 58 and to a capacitor 60 across which the output voltage $V_O$ is provided.

The output voltage $V_O$ is fed back to the primary-side of the converter 10 via an opto-coupler 64. In particular, a linear regulator 66 biases the internal secondary-side opto-coupler diode (not shown) which causes an isolated primary-side opto-coupler transistor (not shown) to selectively conduct in accordance with the level of the output voltage $V_O$. The primary-side output of the opto-coupler 64 provides a voltage $V_O'$, which is an error signal related to the output voltage $V_O$. The voltage $V_O'$ is coupled to the controller 20 via a resistor divider including resistors 70 and 72 and an FB pin of the controller 20. A COMP pin of the controller 20 is AC coupled to the FB pin via a capacitor 74, as shown. As will be described below, the output voltage feedback components 70, 72 and 74 are coupled to an operational amplifier internal to the controller (see FIG. 2) and are selected in accordance with frequency compensation/stability considerations.

A current sense transformer 34 senses the current through the transformer primary winding 12a and switch 16. To this end, a primary winding 34a of the current sense transformer 34 is coupled in series with the transformer primary winding 12a. The voltage across a secondary winding 34b of the current sense transformer 34 is processed by a rectifier and filter circuit 40, including resistors 42, 44 and 46, a diode 48 and a capacitor 50, coupled as shown. The resulting voltage across capacitor 50 is proportional to the primary current and is coupled to the controller 20 via a CS pin.

A CT pin of the controller 20 is coupled to a timing capacitor 76 across which an oscillator ramp signal $V_{CT}$ is generated. The oscillator ramp signal $V_{CT}$ is used by the controller 20 to control the duty cycle of the primary switch 16, as will be described. The CS pin of the controller 20 is coupled to the CT pin via a slope compensation circuit 78, including a capacitor 80, resistors 82, 84 and a transistor 86, connected as shown. The slope compensation circuit 78 serves to superimpose a portion of the oscillator waveform at the CT pin onto the voltage analog of the inductor current at the CS pin in order to ensure operational stability.

A bootstrap, or auxiliary winding 58b of the output inductor 58 is used to generate a supply voltage Vdd for powering the PWM controller 20 and associated circuitry. To this end, the auxiliary winding 58b is coupled to a diode 90, a resistor 93, a capacitor 92 and a Zener diode 94 across which the voltage Vdd is provided for coupling to a Vdd pin of the controller 20. Preferably, a bypass capacitor 96 is coupled between the Vdd pin and ground, as shown. In one embodiment, the supply voltage Vdd has a nominal value of eleven volts.

Since it takes time after power up of the supply 10 for the voltage across the auxiliary winding 58b of the inductor 58 to rise to a level necessary to generate sufficient supply voltage Vdd, the supply voltage Vdd is initially provided by the input voltage $V_{IN}$ via a resistor 97 and transistor switch 98, such as the illustrated n-channel MOSFET device. The gate of NMOS transistor 98 is controlled by a GT signal provided at the GT pin of the controller 20, as shown. As will become apparent by reference to FIG. 2 below, at power up, the GT signal is high, thereby leaving the depletion transistor 98 on and permitting the voltage Vin to provide the supply voltage Vdd. The amplifier driving GT will regulate Vdd at 10V on power up until the converter is fully operational at which time the bootstrap circuit (diode 90 and winding 58b) charges the bypass capacitor 92 above this 10V regulated voltage. Once this capacitor charges above 10V, the amplifier driving GT goes out of regulation and is driven low. When GT is low, the depletion transistor 98 is turned off and the power for the chip is attained through the bootstrap circuit.

The frequency foldback circuitry of the controller 20 is responsive to the output voltage $V_O$. To this end, a peak detector circuit 110 is coupled to the auxiliary winding 58b of the output inductor 58 in order to sense the peak of the output voltage $V_O$. The illustrative peak detector circuit 110 includes a diode 112, resistors 114 and 116 and a capacitor 120, connected as shown. In operation, the capacitor 120 is charged to the peak of the output voltage. The voltage across capacitor 120 is scaled by a resistor divider including resistors 118 and 132 to provide a VOUT voltage for coupling to a VOUT pin of the controller 20. The VOUT voltage is thus proportional to the output voltage $V_O$.

An ION pin of the controller 20 is coupled to an external resistor 138, the size of which controls the rate at which the timing capacitor 76 is charged. Similarly, an IOFF pin of the controller 20 is coupled to an external resistor 136, with the rate at which the timing capacitor 76 is discharged being a function of the size of resistor 136. As will be described further below, the timing capacitor discharge rate is additionally a function of the output voltage $V_O$ as represented by the feedback voltage VOUT, for purposes of implementing the frequency foldback scheme. A reference voltage, that is generated at a VREF pin of the controller 20 in response to the supply voltage Vdd, is coupled to the VOUT pin via a resistor 130. The purpose of coupling the reference voltage to the VOUT pin is to ensure a minimum operating frequency during start-up and short circuit conditions. A bypass capacitor 134 is coupled to the VREF pin, as shown.

As will be described further below, the volt-second duty cycle clamp feature of the controller 20 is responsive to the input voltage $V_{IN}$. To this end, a resistor divider, including resistors 142 and 144, divides down the input voltage $V_{IN}$ for coupling to a VVS pin of the controller.

Figure 10:
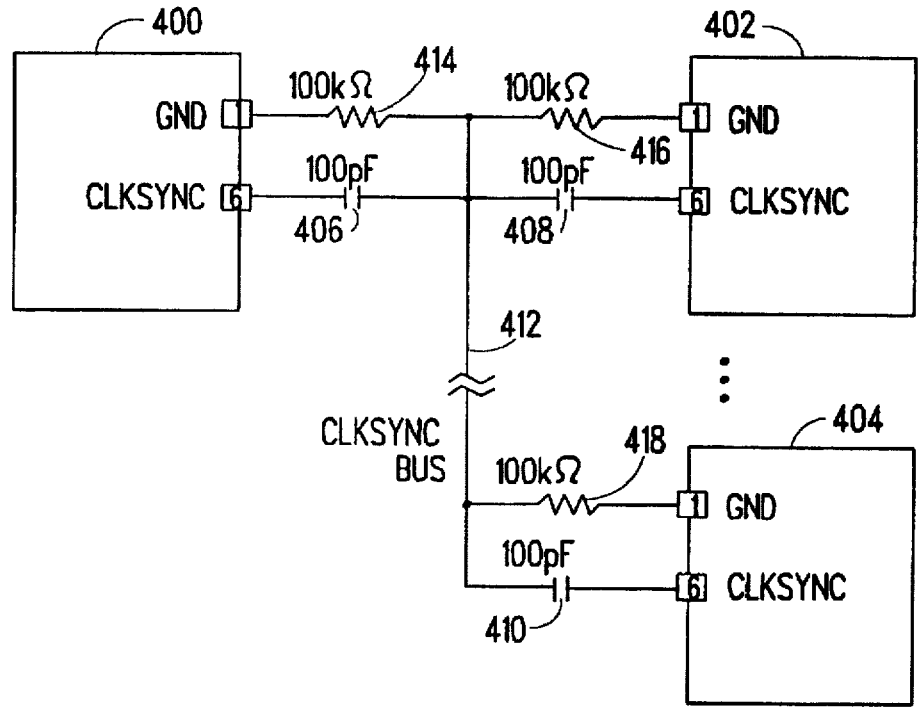
FIG. 10 shows a plurality of synchronized power supply controllers.

Additional pins of the PWM controller 20 include a PGND pin and a GND pin, which are externally coupled together in order to connect the power ground and analog control grounds of the converter 10 at the center of a star ground configuration. A CLKSYNC pin is provided for purposes of synchronizing the controller oscillator (FIGS. 2 and 3) to an external clock signal, such as may be provided by another converter, as shown in FIG. 10. A CSS pin of the controller 20 is coupled to an external capacitor 140 for purposes of implementing a softstart feature, whereby the duty cycle of the power switch 16 is slowly increased for a period following power up and overcurrent conditions. In particular, the capacitor 140 determines the softstart period.

Figure 2:
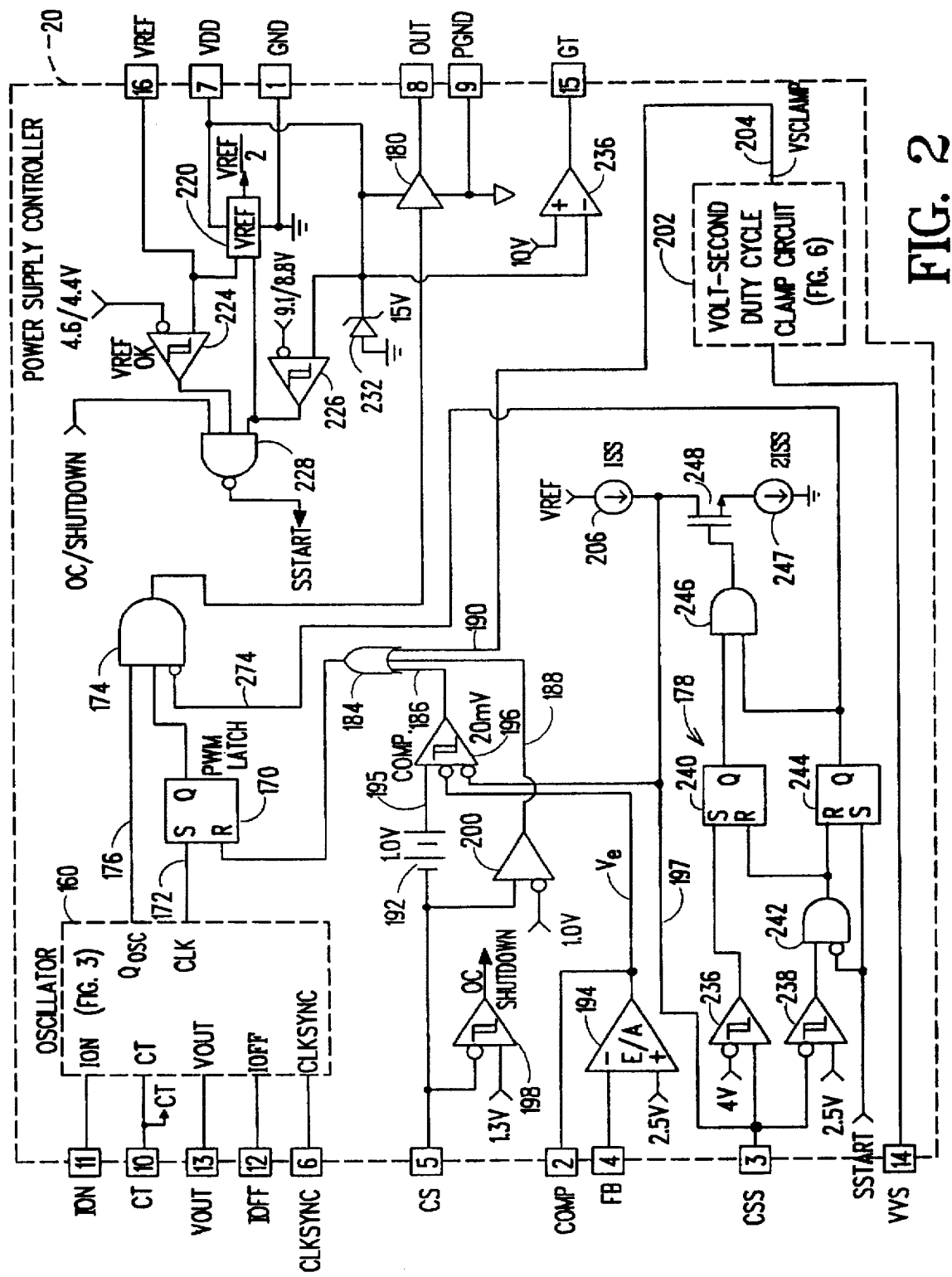
FIG. 2 is a schematic of the controller of FIG. 1.

Referring also to FIG. 2, a block diagram of the PWM controller 20 is shown. The controller includes an oscillator 160 which controls the charging and discharging of the timing capacitor 76 coupled to the CT pin. More particularly, the oscillator 160 is responsive to the VOUT voltage and to the currents at the ION and IOFF pins for controlling the charging and discharging of the timing capacitor 76, as will be described further below in conjunction with FIG. 3. The oscillator 160 may also be responsive to a signal at the CLKSYNC pin for synchronizing the oscillator ramp signal $V_{CT}$ developed across the timing capacitor 76 to an external clock signal.

The oscillator 160 provides a CLK output signal 172 which has a positive going pulse at the start of each charging interval of the timing capacitor 76 and a $Q_{OSC}$ output signal 176 which is at a logic high level when the timing capacitor 76 is charging and is at a logic low level when the timing capacitor 76 is discharging. The CLK signal 172 is coupled to a set input of a PWM latch 170 and the $Q_{OSC}$ output signal 176 is coupled to an input of an AND gate 174. The output of the PWM latch 170 is also coupled to an input of the AND gate 174. A final input to AND gate 174 is provided by the softstart circuitry 178, as will be described below. The output of the AND gate 174 is coupled to a driver 180 which provides the gate drive signal for the primary switch 16 at the OUT pin of the controller 20. In the illustrative embodiment, the peak source current at the OUT pin is 0.5 A and the peak sink current is 1.0 A.

The PWM latch 170 is reset by an OR gate 184, the inputs to which are provided on signal line 186 by the output of a PWM comparator 196, signal line 188 by the output of an overcurrent pulse-by-pulse comparator 200 and signal line 190 by a VSCLAMP output signal 204 of a volt-second duty cycle clamp circuit 202. The volt-second duty cycle clamp circuit 202 is responsive to the voltage at the VSS pin, as will be described further in conjunction with FIG. 6.

More particularly, an error amplifier 194 has an inverting input coupled to the FB pin and a non-inverting input receiving a reference voltage, such as VREF/2, or 2.5 volts. The error amplifier 194 generates an error voltage Ve at its output and can, in general be configured as a PID controller to close the voltage control loop. In the illustrative embodiment, integral compensation is used. The error voltage Ve is coupled to the COMP pin and to an inverting input of the PWM comparator 196. Also coupled to an inverting input of the PWM comparator 196 is a CSS signal 197 from the softstart circuitry 178, as will be described. The non-inverting input of the PWM comparator 196 receives a current sense signal 195 which is equal to the voltage at the CS pin offset by a bias voltage 192, such as the illustrated 1.0 volts. The use of the bias voltage 192 permits zero duty cycle operation.

In operation, the PWM comparator 196 compares the current sense signal 195 to the CSS signal 197 and the error voltage Ve. The output signal 186 of the PWM comparator 196 transitions when the lower of the CSS signal 197 and the error voltage Ve crosses the current sense signal 195. During a softstart cycle, either following power up or due to an overcurrent condition, the CSS signal 197 will be lower than the error voltage Ve and will govern the output of the PWM comparator 196.

In normal operation, the output of the PWM comparator 196 controls the duty cycle of the primary switch 16 by resetting the PWM latch 170. Note however, that the PWM latch 170 may alternatively be reset by the pulse-by-pulse current limit signal 188 or by the VSCLAMP signal 204. It is noted that, in the illustrative embodiment, the PWM latch 170 is "reset dominant" in that a logic high signal at the set input (i.e., the CLK signal 172) will only cause the Q output of the latch to go high if the reset input to the latch (i.e., the output of the OR gate 184) is low.

The CS pin of the controller 20 is additionally coupled to a comparator 198 for comparison to a reference voltage, such as the illustrated 1.3 volts. The output of the comparator 198 is thus indicative of whether or not the CS signal is above this reference voltage. If a CS signal exceeds this reference voltage, an overcurrent condition is indicated. The output of the comparator 198 provides an OC/SHUTDOWN signal to a NAND gate 228 in order to initiate a softstart cycle, as described below.

The supply voltage Vdd is coupled to a reference voltage circuit 220, the output of which provides the reference voltage, VREF, such as 5.0 volts, and VREF/2, such as 2.5 volts. The Vdd voltage is also coupled to a Zener diode 232 and to a comparator 236, as shown. The comparator 236 compares the supply voltage Vdd to a reference voltage, such as ten volts. When the supply voltage Vdd is less than the reference voltage, the GT output signal of comparator 236 is high, thereby turning on the transistor switch 98 (FIG. 1). With this arrangement, the supply voltage Vdd is provided by the input voltage $V_{IN}$. When the supply voltage Vdd is greater than the reference voltage, GT output signal of comparator 236 is low, thereby shutting off the switch 98. With this arrangement, the supply voltage Vdd is provided by the auxiliary winding 58b of inductor 58. Preferably, the amplifier 236 has approximately 300 mV of hysteresis, so as to prevent oscillation during start up.

The supply voltage Vdd is further coupled to a comparator 226 for comparison to a first predetermined reference voltage, such as 8.8 volts, to provide under voltage lock out. Once Vdd exceeds this voltage, comparator 226 goes high which enables the reference voltage circuit 220. Another second comparator 224 compares the reference voltage to a second predetermined reference voltage, such as 4.4 volts. In the illustrative embodiment, each of the comparators 224, 226 has approximately 200 mV of hysteresis. The outputs of comparators 224 and 226 are coupled to inputs of the NAND gate 228, a third input to which is provided by the OC/SHUTDOWN signal. The output of the NAND gate 228 provides an SSTART signal for coupling to the softstart circuit 178, as shown.

The softstart circuit 178 includes a pair of comparators 236, 238, each of which is responsive to the CSS signal 197 and to a respective reference voltage, such as the illustrated 4.0 volts and 0.5 volts. The output of the comparator 236 is coupled to the set input of a latch 240, the output of which is coupled to a first input of art AND gate 246. The output of comparator 238 is coupled to a first input of an AND gate 242, a second input to which receives the SSTART signal, as shown. The output of the AND gate 242 is coupled to a reset input of a second latch 244, the set input to which receives the SSTART signal and the output of which is coupled to a second input of the AND gate 246. The output of the AND gate 246 is coupled to the gate of an NMOS transistor 248, the source of which is coupled to a current source 247 sinking a current of 2 ISS and the drain of which is coupled to the CSS signal 197 and to a current source 206 providing a current ISS.

In operation, if the reference voltage VREF falls below 4.4 volts, the supply voltage Vdd falls below 8.8 volts or the OC/SHUTDOWN signal indicates an overcurrent condition, then a softstart cycle is initiated by the SSTART signal going high, (assuming that the voltage at the CSS pin is greater than 4.0 volts). Initiation of a softstart cycle causes the external softstart capacitor 140 (FIG. 1) coupled to the CSS pin to be discharged and then to be slowly charged by the current source 206. More particularly, the high SSTART signal causes the latch 244 to be set and the CSS voltage being above 4.0 volts causes the output of comparator 236 to be high and latch 240 to be set. With both inputs to AND gate 246 high, transistor 248 is turned on to discharge the CSS capacitor 140 by the 2 ISS source 247. The OUT signal of the controller 20 is inhibited during the interval when the softstart capacitor 140 is discharged by signal 247 coupled to the AND gate 174.

Once the capacitor 140 is discharged to 0.5 volts and assuming the SSTART signal has gone low, the capacitor 140 is charged by current source 206. In the illustrative embodiment, the ISS source 206 charges capacitor 140 with a constant twenty microamps until the voltage at the CSS pin reaches 4.0 volts. In this way, the PWM comparator 196 is responsive to the slowly increasing voltage of the CSS signal 197 until the CSS signal exceeds the error voltage Ve, at which time the voltage loop is closed. In particular, softstart cycle duration is given by:

$$t = 3.5 \cdot CSS/ISS \tag{1}$$

Note that the controller IC 20 may implement voltage mode control by driving the CS pin with a fixed ramp signal. Also, voltage feedforward (i.e., a feature whereby the slope of the oscillator ramp signal $V_{CT}$ is adjusted in accordance with variations in the input voltage $V_{IN}$) may be implemented by making the peak of the CS signal proportional to the input voltage $V_{IN}$.

Figure 3:
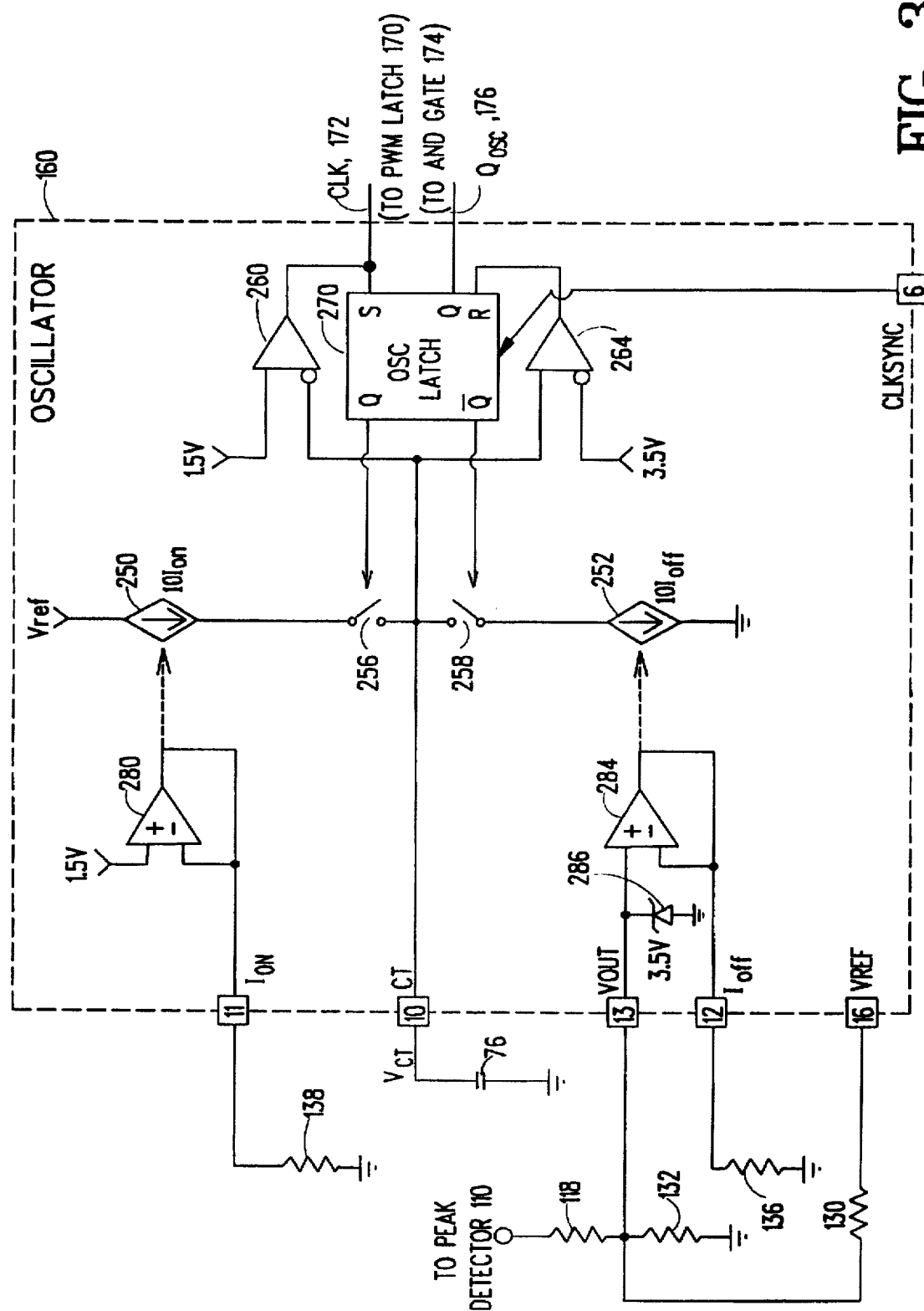
FIG. 3 is a schematic of the oscillator of FIG. 2.

Referring also to FIG. 3, a block diagram of the oscillator 160 is shown to include a pair of dependent current sources 250 and 252. The current sources 250, 252 are connected in series with a pair of switches 256 and 258, as shown. The node interconnecting series switches 256 and 258 is connected to the timing capacitor 76 via the CT pin. The voltage $V_{CT}$ across the timing capacitor 76 is further coupled to a pair of comparators 260 and 264, the output signals of which set and reset an oscillator latch 270, respectively. In particular, comparator 260 compares the oscillator ramp signal $V_{CT}$ to a first predetermined reference voltage, such as 1.5 volts and provides the CLK output signal 172 (FIG. 2), and comparator 264 compares the ramp signal $V_{CT}$ to a second, higher predetermined reference voltage, such as 3.5 volts. The CLK signal 172 sets the oscillator latch 270, as shown.

The Q and $\overline{Q}$ outputs of the oscillator latch 270 control respective switches 256 and 258. The Q output of the oscillator latch 270 causes switch 256 to close and the timing capacitor 76 to be charged by current source 250 once the timing capacitor voltage $V_{CT}$ reaches 1.5 volts. The $\overline{Q}$ output of the oscillator latch 270 causes switch 258 to close and the timing capacitor 76 to be discharged by current source 252 once the timing capacitor voltage $V_{CT}$ reaches 3.5 volts. The Q output of the oscillator latch 270 (i.e., the $Q_{OSC}$ signal 176) is coupled to the AND gate 174 (FIG. 2).

Figure 4:
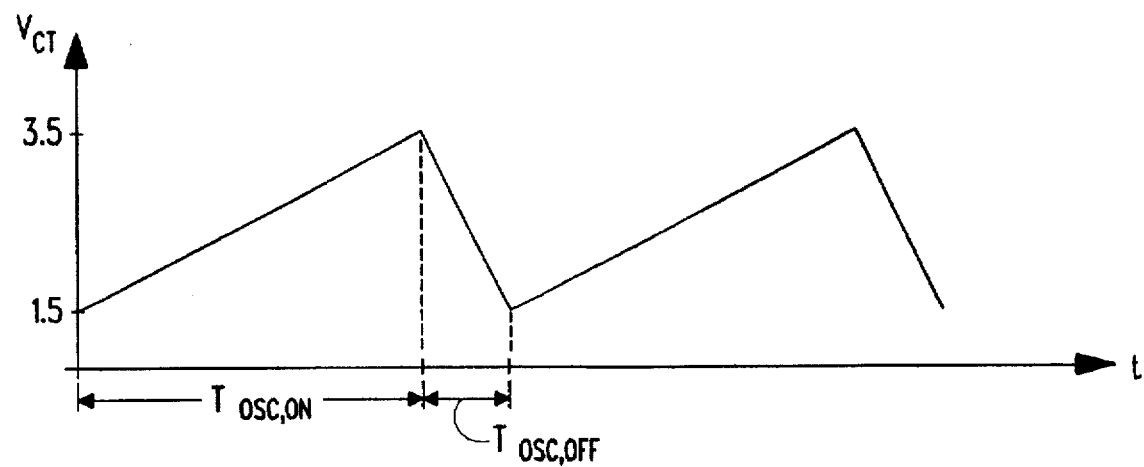
FIG. 4 shows the oscillator ramp signal $V_{CT}$.

Referring also to FIG. 4, the voltage $V_{CT}$ across the timing capacitor 76 (i.e., the oscillator ramp signal) is shown. The interval during which the timing capacitor 76 is charged is labelled $T_{OSC, ON}$ and the interval during which the timing capacitor 76 is discharged is labelled $T_{OSC, OFF}$. The $T_{OSC, ON}$ interval corresponds to the operating interval when the primary switch 16 can be on and the $T_{OSC,OFF}$ interval corresponds to the interval during which the switch 16 must be off. In normal operation, the converter operating frequency is given by:

$$f = \frac{1}{T_{OSC,ON} + T_{OSC,OFF}} = \frac{5}{C76 \cdot \left[\frac{R138}{1.5} + \frac{R136}{3.5}\right]} \tag{2}$$

The on time $T_{OSC, ON}$ of the oscillator 160 is fixed. More particularly, the current source 250 (FIG. 3) is controlled by the output current of an operational amplifier 280, the non-inverting input to which receives a reference voltage, such as the illustrative 1.5 volts, and the inverting input to which is coupled to external resistor 138 via the ION pin. With this arrangement, the current at the ION pin is given by ION=1.5V/R138. The charge current sourced by the current source 250 is maintained constant at ten times the current at the ION pin. By maintaining the oscillator on time constant, a fixed maximum duty cycle is guaranteed as given by:

$$\delta_{MAX} = \frac{T_{OSC,ON}}{T_{OSC,ON} + T_{OSC,OFF}} \tag{3}$$

The off time $T_{OSC, OFF}$ of the oscillator 160 however varies in accordance with the output voltage $V_O$ of the converter 10 (as fed back to the controller as the VOUT voltage) in order to implement the frequency foldback feature. To this end, the current source 252 is controlled by an operational amplifier 284, the non-inverting input to which is connected to the VOUT pin and to a Zener diode 286 and the inverting input to which is connected to the external resistor 136 via the IOFF pin. The Zener diode 286 clamps the maximum voltage at the VOUT pin to 3.5 volts. In operation, the current source 252 sinks a current equal to ten times the current at the IOFF pin and the current at the IOFF pin is given by IOFF=VOUT/R136. Thus, when VOUT decreases, the discharge current decreases, thereby increasing the oscillator off time $T_{OSC, OFF}$ and decreasing the frequency of operation.

Figure 5:
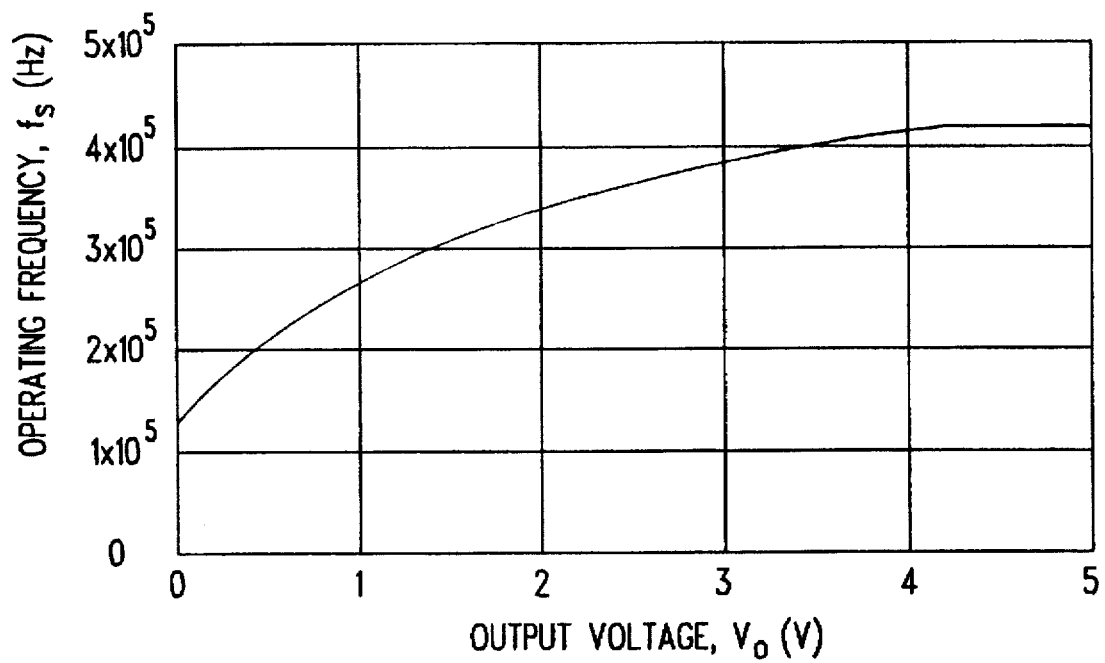
FIG. 5 is a graph illustrating the frequency versus output voltage characteristics of the power supply of FIG. 1.

Referring also to the operating frequency versus output voltage graph of FIG. 5, when the output voltage $V_O$ decreases below a predetermined level, such as approximately 4.25 volts, the discharge current provided by the current source 252 decreases, thereby increasing the $T_{OSC, OFF}$ interval. Conversely, when VOUT increases, the frequency increases (to a predetermined maximum) by increasing the discharge current provided by current source 252.

Figure 6:
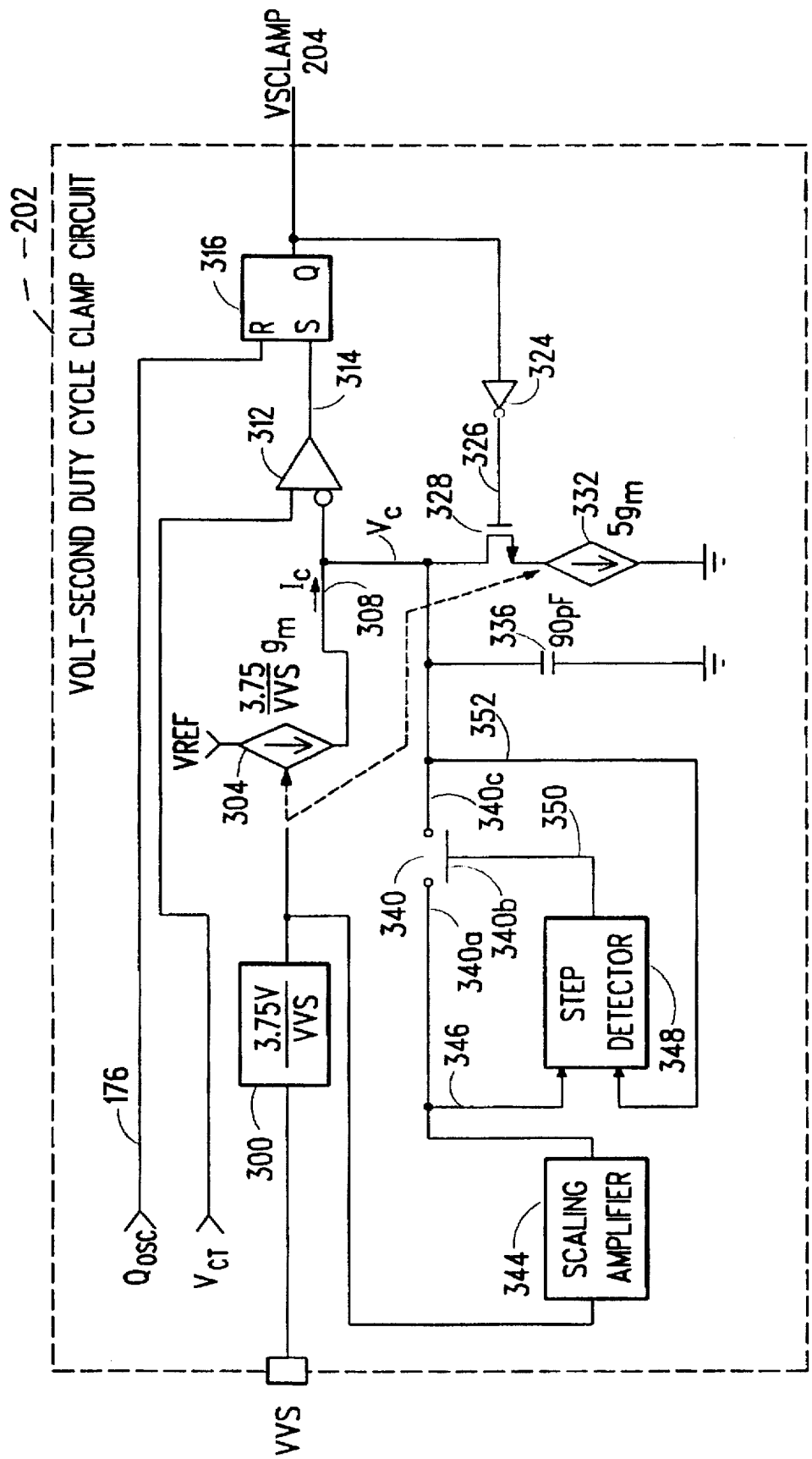
FIG. 6 is a schematic of the volt-second duty cycle clamp circuit of FIG. 2.

Referring to FIG. 6, a schematic of the charge balanced volt-second duty cycle clamp circuit 202 is shown to include an inverter and multiplier circuit 300 which operates on the voltage at the VVS pin to invert such voltage and multiply the inverted voltage by a constant, such as the illustrative 3.75 volts. The output of the inverter/multiplier circuit 300 is coupled to a voltage controlled current source 304 and to a scaling amplifier 344, as shown. The voltage controlled current source 304 provides a current $I_C$ on signal line 308 given by:

$$I_C = \frac{3.75}{VVS} g_m \tag{4}$$

The current $I_C$ charges a capacitor 336.

More particularly, the voltage $V_C$ across the capacitor 336 is compared to the oscillator ramp signal $V_{CT}$ by a comparator 312. The output signal 314 of the comparator 312 sets a latch 316. The latch 316 is reset by the $Q_{OSC}$ signal 176 (FIGS. 2 and 3). The Q output of the latch 316 provides the VSCLAMP signal 204 to the OR gate 184 (FIG. 2). Additionally, the VSCLAMP signal 204 is coupled to an inverter 324 having an output 326 which controls a transistor switch 328, as shown. The source of the transistor 328 is coupled to a current controlled current source 332 which sinks a current given by 5 $g_m$, in order to discharge the capacitor 336. The drain of transistor 328 is coupled to the capacitor 336.

The scaling amplifier 344 provides an output signal 346 to a step detector 348 and to a first terminal 340a of a switch 340. The step detector 348 provides an output signal 350 to a control terminal 340b of the switch 340 and is responsive to the capacitor voltage $V_C$ on signal line 352 at the third terminal 340c of the switch 340.

Figure 7:
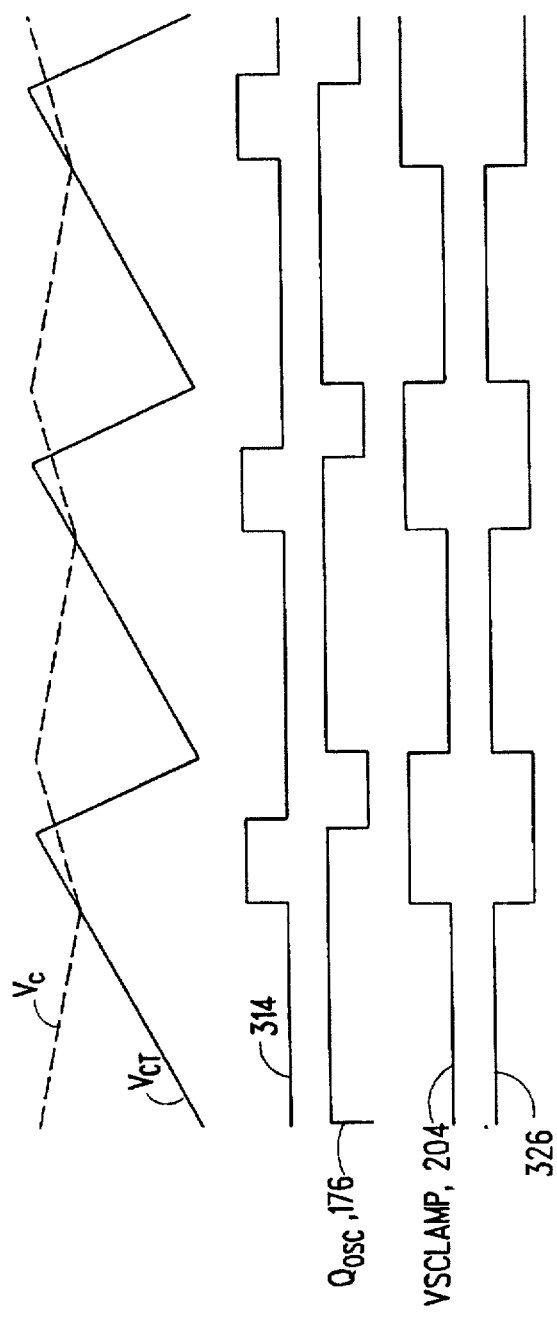
FIG. 7 shows various voltage waveforms associated with the volt-second duty cycle clamp circuit of FIG. 6 for a first input voltage $V_{IN}$.
Figure 8:
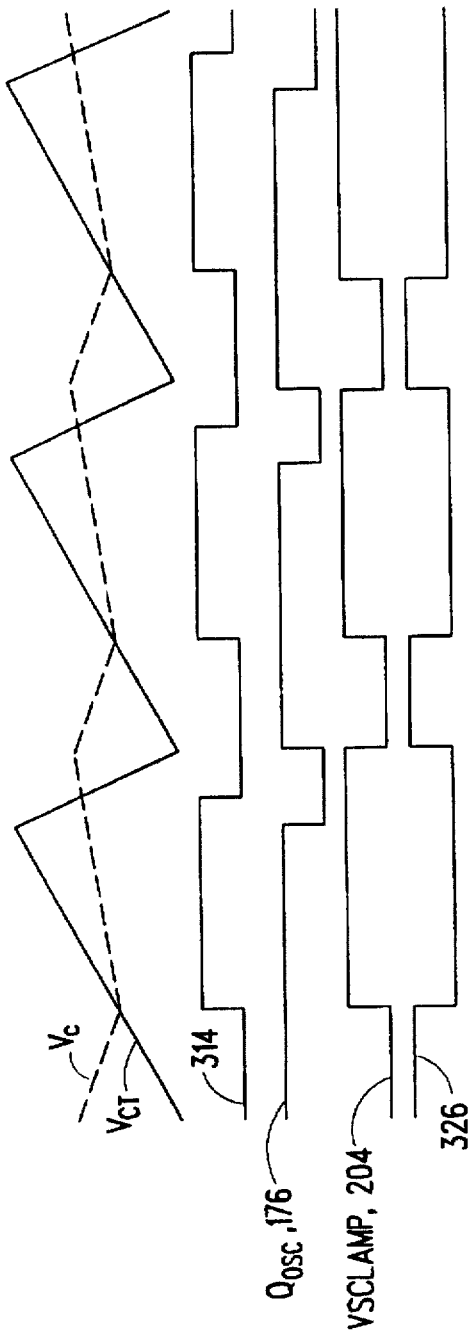
FIG. 8 shows the volt-second duty cycle clamp circuit waveforms of FIG. 7 for a second input voltage $V_{IN}$.

The operation of the volt-second duty cycle clamp circuit 202 will be described in conjunction with FIGS. 7 and 8 which show various voltage waveforms associated with the circuit 202 for different input voltage $V_{IN}$ conditions. FIG. 7 shows waveforms associated with a first, relatively low input voltage $V_{IN}$ and FIG. 8 shows the same waveforms associated with a second, higher input voltage $V_{IN}$. The $V_C$ voltage is the voltage across capacitor 336 which is coupled to the inverting input terminal of the comparator 312 and the oscillator ramp signal $V_{CT}$ is the voltage across the timing capacitor 76 which is coupled to the non-inverting input terminal of the comparator 312. The output signal 314 of the comparator 312 is thus high when the oscillator ramp signal $V_{CT}$ is higher than the $V_C$ voltage and is low otherwise. Recall that $Q_{OSC}$ signal 176 of the oscillator 160 (FIGS. 2 and 3) is high during the $T_{OSC,ON}$ interval of the oscillator ramp signal $V_{CT}$ (i.e., when the timing capacitor 76 is charging) and is otherwise low, as shown. Since the comparator output signal 314 sets the latch 316 and the $Q_{OSC}$ signal 176 resets the latch 316, the VSCLAMP output signal 204 of the latch 316 transitions to a high level on the positive going edges of the comparator output signal 314 and transitions to a low level on the positive going edges of the $Q_{OSC}$ signal 176, as shown.

The output signal 326 of the inverter 324 is an inverted version of the VSCLAMP signal. When the signal 326 is high, the NMOS device 328 is on and capacitor 336 is discharged by current source 332; whereas, when the signal 326 is low, the NMOS device 328 is off and the capacitor 336 is charged by current source 304.

The scaling amplifier 344 and the step detector 348 serve to detect and accommodate rapid changes in the input voltage and thus, in the VVS voltage, in order to speed up the response time of the volt-second duty cycle clamp circuit 202. In this way, transformer 12 (FIG. 1) is prevented from saturating in the event of a rapid change in the input voltage and thus, in the VVS voltage. In particular, the scaling amplifier 344 is responsive to the 3.75/VVS voltage from the inverter/multiplier circuit 300 for determining the appropriate voltage across the capacitor 336. In other words, a particular value of the voltage 3.75/VVS corresponds to a particular voltage across the capacitor 336 in order to achieve the desired volt-second duty cycle clamp. The step detector 348 compares the scaled output voltage 346 of the scaling amplifier 344 to the voltage across the capacitor 336, on signal line 352. In the event that a predetermined difference is detected, the step detector 348 closes the switch 340, thereby connecting the first and third switch terminals 340a and 340c. With the switch 340 closed, additional charge or discharge current is provided to the capacitor 336 by the scaling amplifier 344 in order to bring the voltage $V_C$ thereacross to the level necessary to obtain the desired volt-second duty cycle clamp. In the event that no difference, or less than the predetermined difference, between scaling amplifier output voltage 346 and the capacitor voltage $V_C$ is detected, the step detector 348 opens the switch 340, thereby eliminating the effect of the scaling amplifier 344 on the circuit 202.

At a given input voltage $V_{IN}$ and constant load, the operating duty cycle is fixed. The volt-second clamp duty cycle is set somewhat higher than this operating duty cycle, so as to allow normal closed-loop converter operation. During a load transient, such as a momentary short circuit, the volt-second duty cycle clamp circuit 202 limits the maximum duty cycle, so as to ensure that the main transformer 12 does not saturate. In particular, as $V_{IN}$ increases, the volt-second duty cycle decreases in order to maintain a constant operating volt-second product, as given by:

$$\delta_{VS} = \frac{\delta_{MAX}}{VVS} \tag{5}$$

where $\delta_{VS}$ is the duty cycle based on the volt-second duty cycle clamp circuit 202 and $\delta_{MAX}$ is set by resistor 138 (FIG. 1). In the illustrative embodiment, $\delta_{VS}$ is chosen to exceed to the operating duty cycle by some percentage, such as 10%. Once the fault is removed, the operating duty cycle is no longer controlled by the volt-second clamp circuit 202.

The volt-second duty cycle clamp circuit 202 is particularly accurate since the tolerance of the capacitor 336 does not affect the volt-second duty cycle. This is achieved because of the charge balanced nature of the circuit. In particular, the same amount of charge put into the capacitor 336 as it is charged is removed from the capacitor as it is discharged. That is, the DC level of the voltage $V_C$ is a function of $V_{IN}$ and, while the slope of the $V_C$ voltage is a function of the capacitance 336, it is the DC level of the capacitor voltage that is compared to the oscillator ramp signal $V_{CT}$ and which determines the VSCLAMP signal 204. In the illustrative embodiment, the volt-second duty cycle clamp circuit 202 operates with an accuracy of between approximately 3%–5%. Note that the converter's duty cycle can be limited either by the volt-second duty cycle clamp circuit 202 or the programmable maximum duty cycle clamp as set by the resistor 138 (FIG. 1), depending on operating conditions.

Referring also to FIG. 8, like waveforms to those shown and described above in conjunction with FIG. 7 are shown for a second, higher input voltage $V_{IN}$. As is apparent, the oscillator ramp signal $V_{CT}$ is higher than the capacitor voltage $V_C$ for a longer interval of each cycle as compared to the waveforms of FIG. 7. Thus, the output signal 314 of the comparator 312 is concomitantly high for a longer interval of each cycle, as is the VSCLAMP signal 204. Since the VSCLAMP signal 204 transitions to a logic high level earlier in each operating cycle (as compared to the VSCLAMP signal of FIG. 7), the VSCLAMP signal of FIG. 8 causes the PWM latch 170 (FIG. 2) to be reset earlier in the operating cycle, thereby resulting in a shorter duty cycle.

Figure 9:
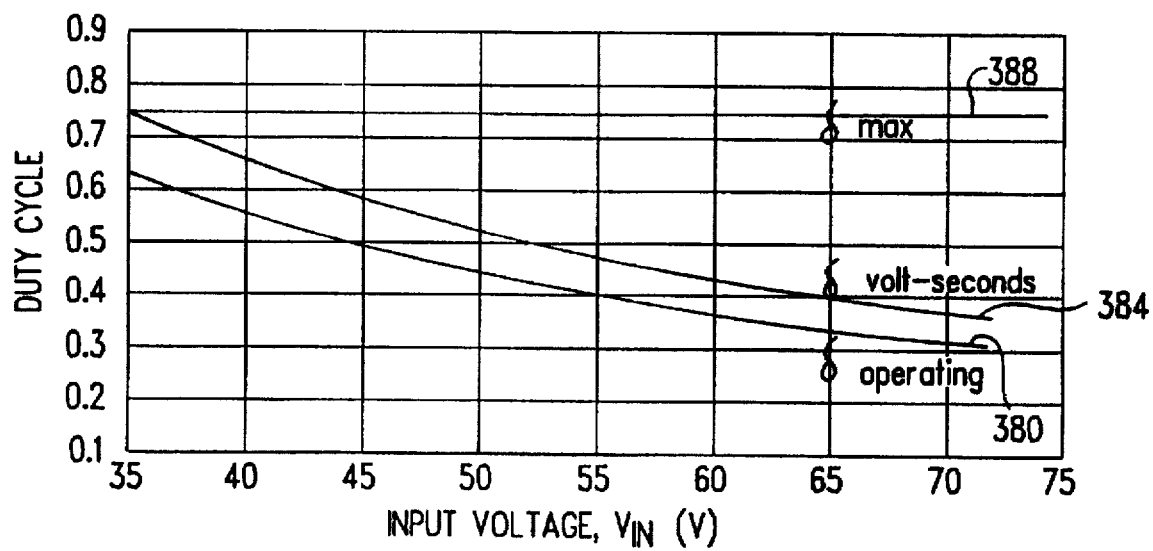
FIG. 9 is a graph illustrating the duty cycle versus input voltage characteristics of the power supply of FIG. 1.

Referring to FIG. 9, a graph of steady state duty cycle versus input voltage $V_{IN}$ is provided. The $\delta_{operating}$ curve 380 illustrates the duty cycle in normal operation. That is, the duty cycle of curve 380 is governed by the error voltage Ve from the error amplifier 194 with no duty cycle limiting involved. The $\delta_{MAX}$ curve 388 illustrates the maximum duty cycle clamp provided by selection of resistor 138. As is apparent, this duty cycle is fixed, regardless of input voltage level. The $\delta_{volt-second}$ curve 384 illustrates the volt-second duty cycle clamp provided by the circuit 202 of FIG. 6. As is apparent, the volt-second duty cycle clamp is somewhat higher than the normal operating duty cycle and decreases with increasing input voltage $V_{IN}$.

Referring to FIG. 10, a plurality of synchronized controllers 400, 402 and 404 of the type shown in FIG. 2 are interconnected. To this end, the CLKSYNC pins of each of the controllers 400, 402 and 404 are AC coupled via respective capacitors 406, 408 and 410 to a CLKSYNC bus 412. The GND pins of the controllers are also coupled to the CLKSYNC bus 412 via respective resistors 414, 416 and 418. An edge triggered active low TTL signal to the CLKSYNC pin synchronizes the oscillator of the controllers to an external clock signal. That is, a negative edge pulse from any of the controllers 400, 402 and 404 will initialize all of the controllers to start the positive slope of the respective oscillator ramp signal. If a controller receives a negative synchronization pulse before its oscillator ramp signal falls to 1.5 volts, then its timing capacitor 76 is quickly discharged to 1.5 volts. Note that when the VOUT voltage decreases below the predetermined level which causes frequency foldback to be activated, the controllers 400, 402 and 404 become unsynchronized. However, when VOUT exceeds the predetermined level, the controllers resynchronize.

Having described the preferred embodiments of the invention, it will now become apparent to one of skill in the art that other embodiments incorporating their concepts may be used. For example, the frequency foldback and volt-second duty cycle clamp features described herein may be used in conjunction with various power supply topologies. It is felt therefore that these embodiments should not be limited to disclosed embodiments but rather should be limited only by the spirit and scope of the appended claims.

We claim:

1. A power supply controller for controlling the duty cycle of a power supply switch as a function of an oscillator ramp signal generated across a timing capacitor in order to provide a regulated output voltage, said power supply controller comprising:

a first current source for charging the timing capacitor with a first fixed current; and a second current source for discharging the timing capacitor with a second fixed current when the regulated output voltage is greater than a predetermined level and for discharging the timing capacitor with a variable current when the regulated output voltage is less than said predetermined level.

2. The power supply controller recited in claim 1 wherein said variable current decreases as the regulated output voltage decreases below said predetermined level.

3. The power supply controller recited in claim 1 further comprising:

a first operational amplifier having a first input responsive to a reference voltage and a second input coupled to a first resistor and to an output of said first operational amplifier, wherein said first current source is controlled by a current through said first resistor; and a second operational amplifier having a first input responsive to a voltage proportional to the regulated output voltage and a second input coupled to a second resistor and to an output of said second operational amplifier, wherein said second current source is controlled by a current through said second resistor, said current through said second resistor being a function of said voltage proportional to the regulated output voltage.

4. The power supply controller recited in claim 1 wherein said first current source charges the timing capacitor for a fixed duration and said second current source discharges the timing capacitor for a variable duration.

5. The power supply controller recited in claim 4 further comprising:

a first comparator for comparing the oscillator ramp signal to a first reference voltage to provide a first comparator output signal;

a second comparator for comparing the oscillator ramp signal to a second reference voltage to provide a second comparator output signal;

a latch set in response to said first comparator output signal and reset in response to said second comparator output signal to provide a latch output signal;

a first switch coupled in series between said first current source and the timing capacitor, said first switch responsive to said latch output signal for selectively coupling and decoupling said first current source to and from the timing capacitor to control said fixed duration during which said first current source charges the timing capacitor; and a second switch coupled in series between the timing capacitor and said second current source, said second switch responsive to an inverted version of said latch output signal for selectively coupling and decoupling said second current source to and from the timing capacitor to control said variable duration during which said second current source discharges the timing capacitor.

6. A power supply comprising:

a power switch operable at a variable duty cycle to convert an input voltage to a regulated output voltage;

a timing capacitor across which an oscillator ramp signal is generated, wherein said variable duty cycle is a function of said oscillator ramp signal; and a power supply controller responsive to said oscillator ramp signal for providing a drive signal to said power switch to control said variable duty cycle, said power supply controller comprising:

a first current source for charging said timing capacitor with a fixed current; and a second current source for discharging said timing capacitor with a fixed current when said regulated output voltage is greater than a predetermined level and for discharging said timing capacitor with a variable current when said regulated output voltage is less than said predetermined level.

7. The power supply recited in claim 6 wherein said variable current decreases as said regulated output voltage decreases below said predetermined level.

8. The power supply recited in claim 6 further comprising:

a first operational amplifier having a first input responsive to a reference voltage and a second input coupled to a first resistor and to an output of said first operational amplifier, wherein said first current source is controlled by a current through said first resistor; and a second operational amplifier having a first input responsive to a voltage proportional to said regulated output voltage and a second input coupled to a second resistor and to an output of said second operational amplifier, wherein said second current source is controlled by a current through said second resistor, said current through said second resistor being a function of said voltage proportional to said regulated output voltage.

9. The power supply recited in claim 6 wherein said first current source charges said timing capacitor for a fixed duration and said second current source discharges said timing capacitor for a variable duration.

10. The power supply recited in claim 9 further comprising:

a first comparator for comparing said oscillator ramp signal to a first reference voltage to provide a first comparator output signal;

a second comparator for comparing said oscillator ramp signal to a second reference voltage, higher than said first reference voltage to provide a second comparator output signal;

a latch set in response to said first comparator output signal and reset in response to said second comparator output signal to provide a latch output signal;

a first switch coupled in series between said first current source and said timing capacitor, said first switch responsive to said latch output signal for selectively coupling and decoupling said first current source to and from said timing capacitor to control said fixed duration during which said first current source charges said timing capacitor; and a second switch coupled in series between said timing capacitor and said second current source, said second switch responsive to an inverted version of said latch output signal for selectively coupling and decoupling said second current source to and from said timing capacitor to control said variable duration during which said second current source discharges said timing capacitor.

11. The power supply recited in claim 8 further comprising a peak detector circuit responsive to said regulated output voltage for generating said voltage proportional to said regulated output voltage.

12. The power supply recited in claim 6 wherein said power supply controller is a peak current mode controller.

13. The power supply recited in claim 6 further comprising a volt-second duty cycle clamp circuit for limiting said variable duty cycle of said power switch to a maximum duty cycle which varies in accordance with said input voltage.

14. A power supply controller for controlling the duty cycle of a power supply switch which is operable to convert an input voltage to a regulated output voltage, said power supply controller comprising:

a volt-second duty cycle clamp circuit for limiting the duty cycle of the power supply switch to a maximum duty cycle set as a function of the voltage across a capacitor charged by a charging current inversely proportional to the input voltage, wherein said capacitor has a tolerance associated therewith and said maximum duty cycle is independent of said tolerance of said capacitor.

15. The power supply controller recited in claim 14 wherein said volt-second duty cycle clamp circuit comprises:

a capacitor;

a comparator having a first input receiving an oscillator ramp signal, a second input coupled to said capacitor, and an output at which a volt-second duty cycle clamp signal is provided;

a first current source coupled to said capacitor and responsive to a voltage inversely proportional to the input voltage for generating said charging current for charging said capacitor; and a second current source coupled to said capacitor through a switch, wherein said switch is controlled in response to said volt-second duty cycle clamp signal for selectively coupling and decoupling said second current source to and from said capacitor to discharge said capacitor.

16. The power supply controller recited in claim 15 further comprising a PWM latch responsive to an operating duty cycle signal and to said volt-second duty cycle clamp signal for controlling the duty cycle of the power switch.

17. The power supply controller recited in claim 15 further comprising:

a scaling amplifier responsive to said voltage inversely proportional to the input voltage for providing an output signal at an output thereof indicative of a voltage across said capacitor corresponding to a desired volt-second duty cycle clamp signal;

a step detector responsive to said output signal of said scaling amplifier and to said voltage across said capacitor for providing an output signal indicative of whether or not a deviation exists between said output signal of said scaling amplifier and said voltage across said capacitor; and a switch coupled in series between said output of said scaling amplifier and said capacitor, wherein said switch is closed in response to said output signal of said step detector if a predetermined deviation is determined to exist between said output signal of said scaling amplifier and said voltage across said capacitor.

18. A power supply comprising:

a power switch operating at a duty cycle to convert an input voltage to a regulated output voltage; and a volt-second duty cycle clamp circuit for limiting said duty cycle of said power switch to a maximum duty cycle set as a function of the voltage across a capacitor charged by a charging current inversely proportional to said input voltage, wherein said capacitor has a tolerance associated therewith and said maximum duty cycle is independent of said tolerance of said capacitor.

19. The power supply recited in claim 18 wherein said volt-second duty cycle clamp circuit comprises:

a capacitor;

a comparator having a first input receiving an oscillator ramp signal, a second input coupled to said capacitor, and an output at which a volt-second duty cycle clamp signal is provided;

a first current source coupled to said capacitor and responsive to a voltage inversely proportional to said input voltage for generating said charging current for charging said capacitor; and a second current source coupled to said capacitor through a switch, wherein said switch is controlled in response to said volt-second duty cycle clamp signal for selectively coupling and decoupling said second current source to and from said capacitor to discharge said capacitor.

20. The power supply recited in claim 19 further comprising a PWM latch responsive to an operating duty cycle signal and to said volt-second duty cycle clamp signal for controlling said duty cycle of said power switch.

21. The power supply recited in claim 19 further comprising:

a scaling amplifier responsive to said voltage inversely proportional to said input voltage for providing an output signal at an output thereof indicative of a voltage across said capacitor corresponding to a desired volt-second duty cycle clamp signal;

a step detector responsive to said output signal of said scaling amplifier and to said voltage across said capacitor for providing an output signal indicative of whether or not a deviation exists between said output signal of said scaling amplifier and said voltage across said capacitor; and a switch coupled in series between said output of said scaling amplifier and said capacitor, wherein said switch is closed in response to said output signal of said step detector if a predetermined deviation is determined to exist between said output signal of said scaling amplifier and said voltage across said capacitor.

* * * * *